(12) United States Patent
Jiang et al.

(10) Patent No.: US 12,470,296 B2
(45) Date of Patent: Nov. 11, 2025

(54) SYSTEM AND METHOD FOR REDUCING POLARIZATION DEPENDENT LOSS IN AN OPTICAL LINK

(71) Applicant: HUAWEI TECHNOLOGIES CO., LTD., Guangdong (CN)

(72) Inventors: Zhiping Jiang, Kanata (CA); Xiang Lin, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 257 days.

(21) Appl. No.: 18/154,468

(22) Filed: Jan. 13, 2023

(65) Prior Publication Data

US 2024/0243811 A1 Jul. 18, 2024

(51) Int. Cl.
*H04B 10/2569* (2013.01)
*H04B 10/077* (2013.01)
*H04B 10/572* (2013.01)

(52) U.S. Cl.
CPC ..... *H04B 10/2569* (2013.01); *H04B 10/0775* (2013.01); *H04B 10/572* (2013.01)

(58) Field of Classification Search
CPC .............. H04B 10/2569; H04B 10/572; H04B 10/2572; H04B 10/0775; H04J 14/0212
See application file for complete search history.

(56) References Cited

U.S. PATENT DOCUMENTS

| | | | | |
|---|---|---|---|---|
| 6,559,991 | B1 * | 5/2003 | Farley ................ | H04B 10/2569 |
| | | | | 398/152 |
| 2005/0200941 | A1 * | 9/2005 | Yao .......................... | G01J 4/00 |
| | | | | 359/301 |
| 2010/0315640 | A1 * | 12/2010 | Webb ................ | H04B 10/2569 |
| | | | | 356/364 |
| 2012/0050846 | A1 | 3/2012 | Akasaka | |
| 2012/0063783 | A1 | 3/2012 | Vassilieva et al. | |

FOREIGN PATENT DOCUMENTS

EP 2182656 B1 * 12/2014 ......... H04B 10/2572

OTHER PUBLICATIONS

Yan et al., Demonstration of In-line Monitoring and Compensation of Polarization-Dependent Loss for Multiple Channels, in IEEE Photon. Technol. Lett., vol. 14, No. 6, Jun. 2002.
Jiang et al., Distributed Polarization Dependent Loss Monitoring Using Polarization Resolved Pilot Tone, Proc. Eur. Conf. Opt. Commun., publishing Group 2022.
Ebrahimzad et al., Low-PAPR Polarization-time Code with Improved Four-dimensional Detection for PDL mitigation in Eur. Conf. Opt. Commun, 2020.

(Continued)

*Primary Examiner* — Leslie C Pascal
(74) *Attorney, Agent, or Firm* — BCF LLP (57) ABSTRACT

The disclosed systems and methods are for reducing polarization dependent loss in an optical link including: i) changing, by a state of polarization (SOP) controller, an SOP of an optical signal propagating in the optical link; ii) computing, by a link controller, a polarization dependent loss (PDL) in a portion of the optical link; iii) generating, by the link controller, a control signal according to the PDL; and iv) based on the control signal, changing, by the SOP controller, the SOP of the optical signal.

13 Claims, 8 Drawing Sheets

(56) References Cited

OTHER PUBLICATIONS

Zamani et al., PDL compensation using whitening matrix in polarization division multiplexed coherent optical transmission in Proc. Opt. Fiber Commun. Conf., 2013.
Heismann, Analysis of a Reset-Free Polarization Contoller for Fast Automatic Polarization Stabilization in Fiber-optic Transmission Systems, J. of Lightwave Tech., vol. 12, No. 4, Apr. 1994.
Koch et al., First Endless Optical Polarization and Phase Tracker, OFC/NFOEC Technical Digest, 2013.

* cited by examiner

SYSTEM AND METHOD FOR REDUCING POLARIZATION DEPENDENT LOSS IN AN OPTICAL LINK

TECHNICAL FIELD

The present disclosure generally relates to optical networks and, in particular, to a system and a method for reducing polarization dependent loss in an optical link.

BACKGROUND

In addressing high data-throughput demands, fiber optic-based communications systems, such as, for example, dense wavelength division multiplex (DWDM) optical transmission and switching systems are configured to combine and simultaneously transmit multiple optical signals operating at different wavelengths along optical fibers at high speeds.

Optical performance monitoring is typically used for managing high capacity DWDM optical transmission and switching systems. Generally, optical performance monitoring involves assessing the quality of data channels by measuring its optical characteristics without directly looking at the transmitted sequence of bits. It is a potential mechanism to improve control of transmission and physical layer fault management DWDM optical transmission and switching systems.

In optical communications, typical roles for optical performance monitoring include ensuring correct switching in reconfigurable optical add-drop multiplexers, setting power levels for dynamic equalization of the gain of optical amplifiers, and providing system alarms and error warning for lost or out of specification optical channels.

One of the relevant parameters to be monitored is polarization dependent loss (PDL). PDL for an optical component or system in an optical link is the maximum, peak-to-peak insertion loss (or gain) variation caused by the optical component or system when stimulated by all possible polarization states. The PDL of the optical component is used to characterize the different power attenuation (loss) on different incident polarization of the optical signals.

The PDL affects the dual polarization optical signal by attenuating the power on orthogonal polarizations differently, and this penalty depends on the incident state of polarization (SOP) of the signal that changes randomly along the optical link. A number of optical components along the optical link cause the PDL, primarily the wavelength selective switch (WSS) widely used in ROADM.

The majority of conventional PDL mitigation techniques are processed at the transceiver through digital signal processing, such as precoding techniques to balance the signal-to-noise ratio of two polarizations, noise whitening technique to combat spatially-colored noise, and in-line PDL monitoring and compensation technique. These conventional techniques fail to mitigate the PDL in the portion of the optical link.

With this said, there is an interest in developing efficient systems and methods for reducing the PDL in the optical link.

SUMMARY

The embodiments of the present disclosure have been developed based on developers' appreciation of the limitations associated with the prior art. More particularly, a common phenomenon in optical communication networks is the variation of the polarization dependent loss (PDL) due to variations in the polarization state of the propagating optical signals in the optical components. The majority of conventional PDL mitigation techniques are processed at the transceiver through digital signal processing, such as precoding techniques to balance the signal-to-noise ratio of two polarizations, noise whitening technique to combat spatially-colored noise, and in-line PDL monitoring and compensation technique. These conventional techniques fail to mitigate the PDL of individual optical components in the optical link.

With this said, the developers have devised a system and a method for reducing the PDL in the optical link. Various techniques of the present disclosure rely on a state of polarization (SOP) controller and a link controller. The SOP controller may adjust the SOP of an optical signal propagating in the DWDM link. The Link controller may compute a PDL in the portion of the optical link and based on the PDL, the link controller may generate a control signal for the SOP controller. According to the control signal, the SOP controller may change the SOP of the optical signal. The process of changing the SOP may be continued until the PDL is below an acceptable threshold.

In accordance with a first broad aspect of the present disclosure, there is provided a system for reducing PDL in an optical link comprising: a state of polarization (SOP) controller configured to change an SOP of an optical signal propagating in the optical link; and a link controller configured to compute a polarization dependent loss (PDL) in a portion of the optical link and accordingly generate a control signal based on which the SOP controller changes the SOP of the optical signal.

In accordance with any embodiments of the present disclosure, the system further comprises: a first pilot tone detector (PTD) configured to detect a first set of pilot tones (PT) signals, embedded in X-polarization and Y-polarization components of the optical signal, before the optical signal is propagated through a first optical element included in the portion of the optical link and provide the first set of detected PT signal to the link controller; and; and a second PTD configured to detect a second set of PT signals in the optical signal after the optical signal is propagated through the first optical element, the SOP controller, and a second optical element included in the portion of the optical link and provide the second set of detected PT signals to the link controller, the second set of PT signals is SOP adjusted version of the first set of PT signals and is affected by the PDL due to the first optical element and the second optical element.

In accordance with any embodiments of the present disclosure, the first optical element and the second optical element are at least one of wavelength selective switches (WSSs), and optical amplifiers.

In accordance with any embodiments of the present disclosure, the link controller computes the PDL based on the first set of detected PT signals and the second set of detected PT signals.

In accordance with any embodiments of the present disclosure, the link controller iteratively generates the control signal until the PDL is less than equal to an acceptable threshold.

In accordance with any embodiments of the present disclosure, the system further comprises a fixed PDL element configured to contribute a fixed PDL to the optical signal.

In accordance with any embodiments of the present disclosure, the fixed PDL element is located adjacent to the SOP controller.

In accordance with any embodiments of the present disclosure, the fixed PDL element is located after the SOP controller.

In accordance with any embodiments of the present disclosure, the SOP controller is one of a liquid crystal SOP controller or a squeezing fiber.

In accordance with a second broad aspect of the present disclosure, there is provided a method for reducing polarization dependent loss (PDL) in an optical link comprising: changing, by a state of polarization (SOP) controller, an SOP of an optical signal propagating in the optical link; computing, by a link controller, a polarization dependent loss (PDL) in a portion of the optical link; generating, by the link controller, a control signal according to the PDL; and based on the control signal, changing, by the SOP controller, the SOP of the optical signal.

In accordance with any embodiments of the present disclosure, detecting, by a first pilot tone detector (PTD), a first set pilot tone (PT) signals, embedded in X-polarization and Y-polarization components of the optical signal, before the optical signal is propagated through a first optical element included in the portion of the optical link; providing, by the first PTD, the first set of detected PT signals to the link controller; detecting, by a second PTD, a second set of PT signals in the optical signal after the optical signal is propagated through the first optical element, the SOP controller, and a second optical element included in the portion of the optical link; and providing, by the second PTD, the second set of detected PT signals to the link controller, the second set of PT signals is SOP adjusted version of the first set of PT signals and is affected by the PDL due to the first optical element and the second optical element.

In accordance with any embodiments of the present disclosure, the method further comprises computing, based on the first detected PT signal and the second detected PT signal computing by the link controller, the PDL.

In accordance with any embodiments of the present disclosure, the method further comprises iteratively generating, by the link controller, the control signal until the PDL is less than equal to an acceptable threshold.

In accordance with any embodiments of the present disclosure, the method further comprises contributing, by a fixed PDL element, a fixed PDL to the optical signal.

BRIEF DESCRIPTION OF THE DRAWINGS

The features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

The instant disclosure is directed to addressing at least some of the deficiencies of the conventional techniques used to mitigate the PDL in the portion of the optical links. In particular, the instant disclosure describes efficient systems and methods for reducing polarization dependent loss (PDL) in optical links.

Unless otherwise defined or indicated by context, all technical and scientific terms used herein have the same meaning as commonly understood by one of ordinary skill in the art to which the described embodiments appertain to.

In the context of the present specification, "controller" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes efficient systems and methods for reducing the PDL in the optical link.

Figure 1:
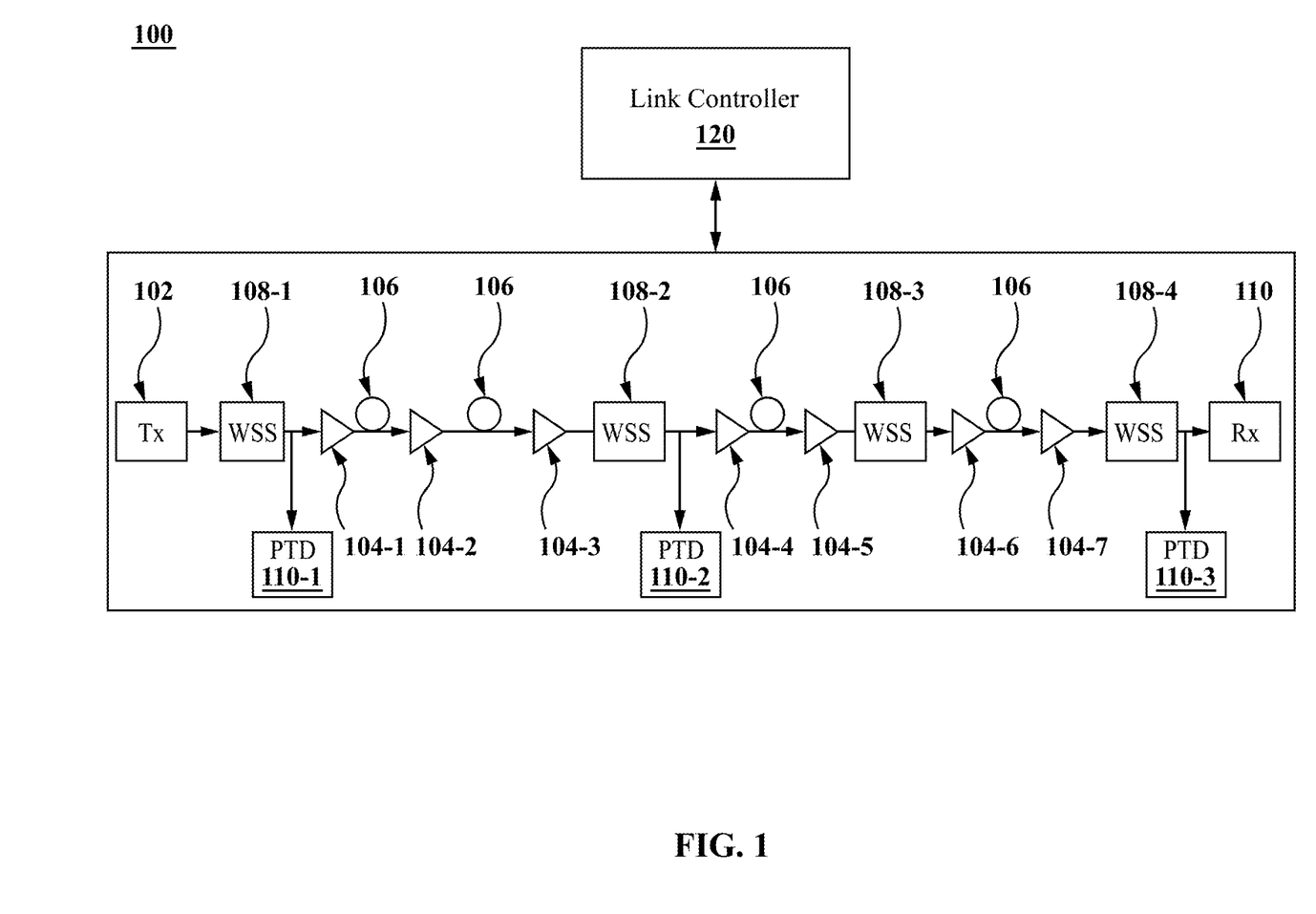
FIG. 1 illustrates a dense wavelength division multiplexing (DWDM) optical link, in accordance with various non-limiting embodiments of the present disclosure.

Referring now to the drawings, FIG. 1 illustrates a dense wavelength-division multiplexing (DWDM) optical link 100, in accordance with various non-limiting embodiments of the present disclosure. As shown, the DWDM link 100 may include a transmitter 102, optical amplifiers 104-1, 104-2, . . . 104-7, optical fibers 106, wavelength selective switches (WSSs) 108-1, 108-2, . . . 108-4, a receiver 110, and a link controller 120. The DWDM optical link 100 may include other components. However, such components have not been illustrated for the purpose of simplicity.

The transmitter 102 may generate optical signals (interchangeably referred to as wavelength channels) to be transmitted over the optical fibers 106. The transmitter 102 may also incorporate one or more laser light sources configured to produce, emit, or radiate pulses of light with certain pulse duration. It is also contemplated that the emitted light may be single polarized, or dual polarized depending on the signal format.

The optical amplifiers 104-1, 104-2, . . . 104-7 may be located along the optical fibers 106. The optical amplifiers 104-1, 104-2, . . . 104-7 may be used to compensate the loss from the optical fibers 16 and the associated components. It is to be noted that, for the purpose of simplicity only one transmitter 102 and one receiver 110 have been illustrated. In various non-limiting embodiments, there may be a set of transmitters (each with a unique wavelength) and a set of receivers. Optical signals from the set of transmitters may be multiplexed by an optical multiplexer on the transmitter side and the multiplexed optical signals may be demultiplexed by a demultiplexer on the receiver side.

The WSSs 108-1, 108-2, . . . 108-4 in between the transmitter 102 and the receiver 110 may be used to drop and/or add wavelength channels, and route wavelength channels. The WSSs 108-1, 108-2, . . . 108-4 may act as optical filters. The WSSs 108-1, 108-2, . . . 108-4 may adjust/equalize the wavelength channel power.

In some embodiments, the DWDM optical link 100 may be a point-to-point optical link. In other non-limiting embodiments, the DWDM optical link 100 may be a portion of a mesh optical network with more advanced reconfigurable optical add-drop multiplexers (ROADMs) where the optical signals may be rerouted to different fibers at ROADM site. It will be appreciated that how the DWDM optical link 100 is implemented should not limit the scope of present disclosure.

The link controller 120 may communicate with other components of the DWDM link 100 such as, for example, the transmitter 102, the optical amplifiers 104-1, 104-2, . . . 104-7, the WSSs 108-1, 108-2, . . . 108-4, the receiver 110 or the like. The link controller 120 may control functionalities of various components of the DWDM link 100 and may have access to a link topology of the DWDM link 100. Also, the link controller 120 may have access to the various link parameters e.g., WSS location, span loss, amplifier gain, amplifier noise figure, input power to amplifier or the like). It is to be noted that where the link controller 120 is located in the DWDM link 100 and how the link controller 120 communicate with the other components should not limit the scope of the present disclosure.

An optical signal travelling in the DWDM link 100 may experience PDL from different optical components, such as, the WSSs 108-1, 108-2, . . . 108-4, the optical amplifiers 104-1, 104-2, . . . 104-7, or the like. As such, various non-limiting embodiments of the present disclosure are directed towards reducing the PDL in the DWDM link 100 due to various optical components present in the DWDM link 100.

The optical components (also referred to optical elements), as referred to herein, comprise one or more passive and/or active optical network components and/or modules of the DWDM link 100, including, but not limited to, optical fiber, optical amplifiers, optical filters, optical links, WSSs, arrayed waveguide gratings, and laser light sources.

In the DWDM link 100, an amplitude modulation pilot tone (PT) signal may be used to monitor the channel power. The "amplitude modulation pilot tone signal" (also referred to herein as "PT signal") is configured to be a low-frequency (e.g., kHz to MHz) amplitude/intensity modulation applied to an optical signal. The PT signal may include single or multiple frequencies. The spectral characteristics of the PT signal should not limit the scope of present disclosure.

The modulation depth and corresponding power of the PT signal is usually small (e.g., a few percent of the channel power). The PT signal provides an in-band ancillary channel for performance monitoring.

Each channel may be modulated with a different PT signal. For example, different modulation frequencies may be applied to different channels. Different spreading sequences may also be applied to spectra-spread PT signals. Accordingly, a power of a particular PT signal may be used for indicating the power of the optical signal in a wavelength division multiplexed (WDM) system. The PT signal may be further modulated to carry channel characterizing information.

In addition to the components discussed, the DWDM link 100 may include PT detectors (PTDs) 110-1, 110-2, and 110-3. In addition to the usual traffic data modulation, the transmitter 102 may receive a bit stream that may include channel specific information such as central wavelength, modulation format, baud rate, spectrum shape, source/destinations, etc. The transmitter 102 may convert the data bit stream into a coded data stream and encode a PT signal with the coded data stream to produce a coded PT signal. Further, transmitter 102 may modulate an amplitude of the optical signal with the coded PT signal. The steps of receiving, converting, encoding, and modulating may be performed by an encoder included in transmitter 102.

With this said, it will be appreciated that there are different types of PT signals that could be used. The most common is amplitude modulated PT (AM-PT, or PT for simplicity). The transmitter 102 may apply a small, relatively low frequency (kHz/MHz) amplitude/intensity modulation to the optical signal (GHz). Each optical signal may be applied with a unique low frequency PT signal.

Figure 2:
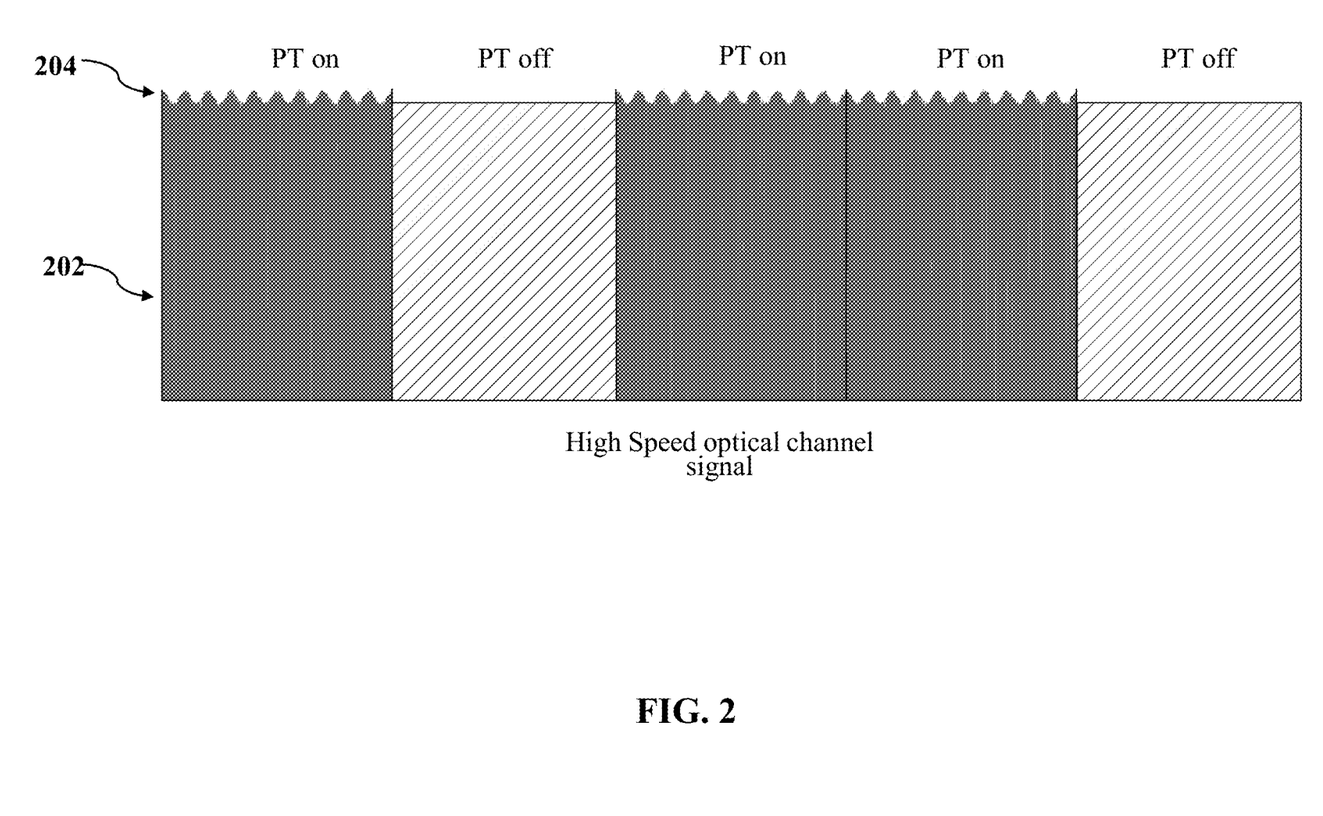
FIG. 2 illustrates a representative optical signal with a pilot tone signal amplitude modulated over the representative optical signal, in accordance with various non-limiting embodiments of the present disclosure.

In order to detect the PT signals, at least one photodetector (PD) may be used to detect all the optical signals without optical de-multiplexing. The existence and channel power of all optical signals may be simultaneously monitored by doing spectral analysis in electrical, or equivalently digital domain. This provides a low-cost monitoring solution. The PT signal may be further turned on and off to carry channel specific information. FIG. 2 illustrates a representative optical signal 202 with a PT signal 204 amplitude modulated over the representative optical signal 202, in accordance with various non-limiting embodiments of the present disclosure.

A common phenomenon in optical communication networks is the variation of the PDL due to variations in the polarization state of the propagating optical signals in the optical components. In the DWDM link 100, the propagating optical signal may be affected by the random state of polarization (SOP) due to various optical components. The relative direction of the PDL may be determined by the fiber SOP rotation, is random, and may change over time. Various factors such as, temperature, strain, lightning effects, or the like, may cause SOP rotation in fiber 106. The PDL may be expressed as the difference between the maximum and minimum loss in decibels. In other words, the PDL may be used to characterize the different power attenuation due to the different incident polarization of the optical signals.

Figure 3:
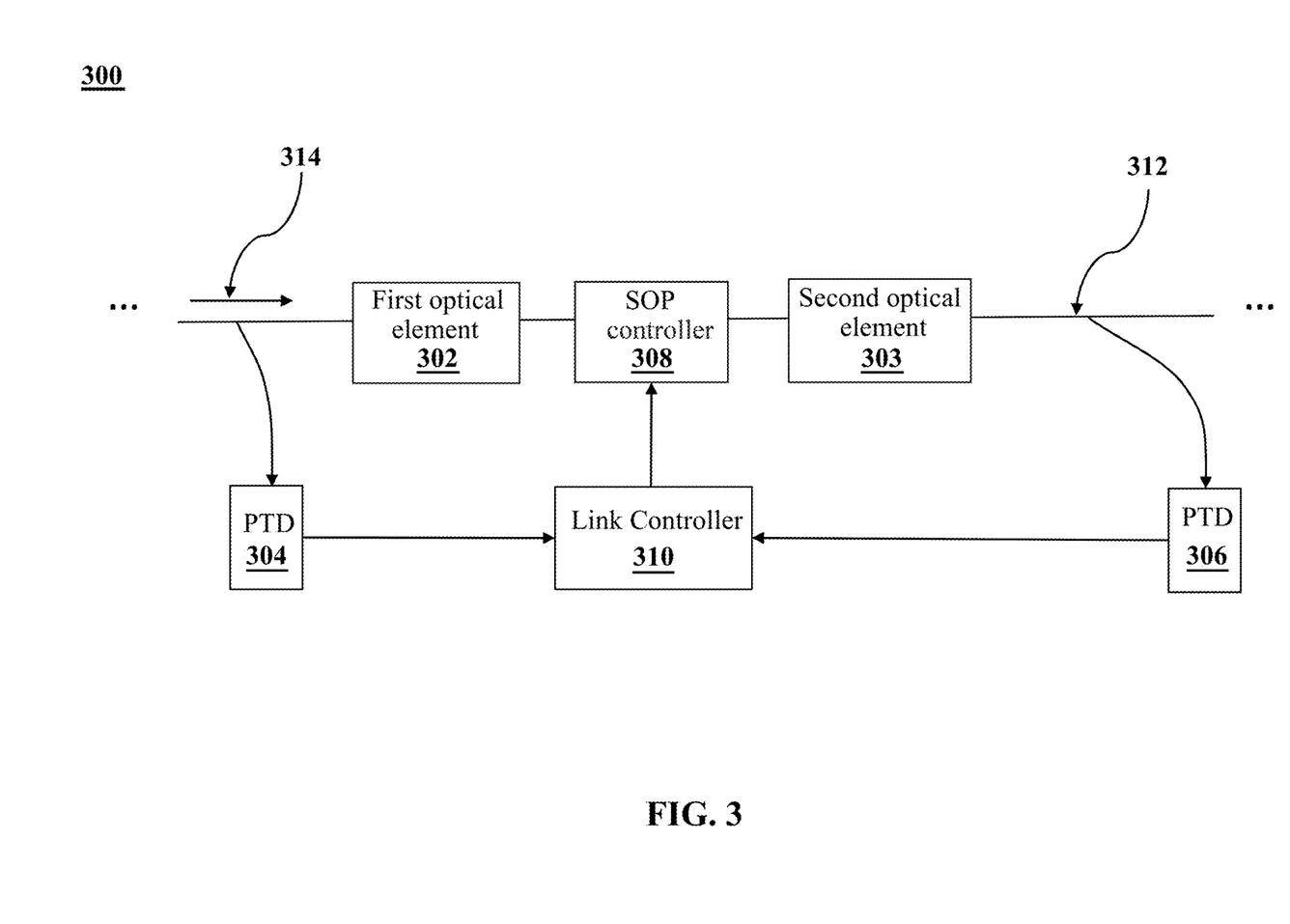
FIG. 3 illustrates a portion of the DWDM link depicting the reduction of polarization dependent loss (PDL), in accordance with various non-limiting embodiments of the present disclosure.

With this said, there is an interest in determining the PDL across a given portion in the DWDM link and reducing the PDL across the given portion. FIG. 3 illustrates a portion 300 of the DWDM link 100 depicting the reduction of the PDL, in accordance with various non-limiting embodiments of the present disclosure. As shown, the portion 300 may include a first optical component 302, a second optical component 303, a first PTD 304, a second PTD 306, an SOP controller 308, and a link controller 310. Various components of the portion 300 may be communicatively coupled via optical fiber 312. It is contemplated that the first optical component 302, the second optical component 303, the first PTD 304, the second PTD 306, the link controller 310, the optical fiber 312 may be implemented similar to the WSSs 108-1, 108-2, . . . 108-4, the PTDs 110-1, 110-2, 110-3, the link controller 120 and the optical fiber 106 respectively.

An optical signal 314 may be propagating in the portion 300, in which the optical signal may be X- and Y-polarized. In certain embodiments, the X-polarized component and the Y-polarized component of the propagating optical signal 314 may be modulated with different PTs by the transmitter 102. By way of example, the transmitter 102 may be configured to add a PT with frequency $f_x$ to the X-polarized component of the optical signal 314. Similarly, the transmitter 102 may be configured to add a PT with frequency $f_y$ to the Y-polarized component of the optical signal 314. The first PTD 304 may be configured to measure the power difference $\Delta P_1$ (in dB unit) between two orthogonal polarizations before the optical signal 314 is progressed through the first optical component 302. The power difference $\Delta P_1$ may be represented as:

$$\Delta P_1 = 10\log_{10}\left(\frac{P_{1f_x}}{P_{1f_y}}\right) \quad (1)$$

where, $P_{1f_x}$ and $P_{1f_y}$ are the PT associated powers related to the X-polarized component and the Y-polarized component of the optical signal 314 before the optical signal 314 is progressed through the first optical component 302.

The second PTD 306 may be configured to measure the power difference $\Delta P_2$ (in dB unit) between two orthogonal polarizations after the optical signal 314 is progressed through the first optical component 302, the SOP controller 308, and the second optical component 303. The power difference $\Delta P_2$ may be represented as:

$$\Delta P_2 = 10\log_{10}\left(\frac{P_{2f_x}}{P_{2f_y}}\right) \quad (2)$$

Where, $P_{2f_x}$ and $P_{2f_y}$ are the PT associated powers related to the X-polarized component and the Y-polarized component of the optical signal 314 after the optical signal 314 is progressed through the first optical component 302, the SOP controller 308, and the second optical component 303.

From the power differences $\Delta P_2$ and $\Delta P_1$, the link controller 310 may determine the PDL contributed by the first optical component 302 and the second optical element 303 to the portion 300. To determine the PDL, the link controller 310 may compute a difference between the power differences $\Delta P_2$ and $\Delta P_1$ as:

$$\Delta P_{21} = \Delta P_2 - \Delta P_1 \quad (3)$$

To determine the PDL in the portion 300, the link controller 310 may compute a maximum and a minimum value of the $\Delta P_{21}$. In order to obtain the minimum and maximum of $\Delta P_{21}$, the optical signal 314 may be exposed to different polarization states. The PDL may be represented as:

$$PDL = 0.5\left(\Delta P_{21}^{max} - \Delta P_{21}^{min}\right) \quad (3)$$

In the event that the PDL is below an acceptable threshold, the link controller 310 may not take any action. However, if the PDL is above the acceptable threshold, the link controller 310 may send a control signal to the SOP controller 308. Based on the control signal, the SOP controller 308 may alter (for example, change) the X-polarization and Y-polarization components of the optical signal 314. How the SOP controller 308 is implemented and how the SOP controller 308 alters the polarization should not limit the scope of present disclosure.

In certain non-limiting embodiments, the SOP controller 308 may be operated with a feedback based on the control signal generated by the link controller 310. The polarization controller may have the task of transforming a fixed, known polarization into an arbitrary one. Since polarization may be defined by two degrees of freedom, for example azimuth angle and ellipticity angle of the polarization state, such a polarization controller needs two degrees of freedom. The same holds for the task of transforming an arbitrary polarization into a fixed, known one.

The polarization controller 308 may be, for example, be obtained by placing on the optical path three rotatable waveplates in cascade: a first quarterwave plate, which may be oriented to transform the incident elliptical polarization into linear polarization, a halfwave plate, which may transform this linear polarization into another linear polarization, and a second quarterwave plate, which may transform the other linear polarization into the desired elliptical output polarization.

In one example, the SOP controller 308 may be based on a liquid crystal SOP controller. In other examples, the SOP controller 308 may be based on a squeezing fiber.

Without limiting the scope of present disclosure, the acceptable threshold may be represented in terms of a maximum value of the PDL observed in the portion 300 for different polarization states that the optical signal 314 may be exposed to. Based on the maximum value of the PDL, the acceptable threshold may be referred to as acceptable value of the PDL that is significantly lower than the maximum value of the PDL. For example, the acceptable threshold may be 10%, 15%, 20% or any other suitable percentage of the maximum value of the PDL.

Based on the alteration of the X-polarization and Y-polarization components of the optical signal 314, the first PTD 304 and the second PTD 306 may again measure the updated power differences $\Delta P_1$ and $\Delta P_2$ between two orthogonal polarizations respectively. Based on the updated power differences $\Delta P_1$ and $\Delta P_2$ the link controller 310 may again determine the PDL in the portion 300. In the event that the PDL is below the acceptable threshold, the link controller 310 may not take any further action. However, if the PDL is above the acceptable threshold, the link controller 310 may again send another control signal to the SOP controller 308. The SOP controller 308 may again alter the X-polarization and Y-polarization components of the optical signal 314. This process of altering the polarization of the optical signal 314 may be repeated until the PDL is reduced to at least the acceptable threshold.

In certain non-limiting embodiments, in addition to the SOP controller 308, the portion 300 may further include a fixed PDL element. The fixed PDL element may contribute a fixed PDL which is independent of the frequency of the optical signal 314. Some of the non-limiting examples of the fixed PDL element may include PDL emulator. The fixed PDL element may assist the SOP controller 308 to further reduce the PDL contributed by the first optical component 302.

Figure 4:
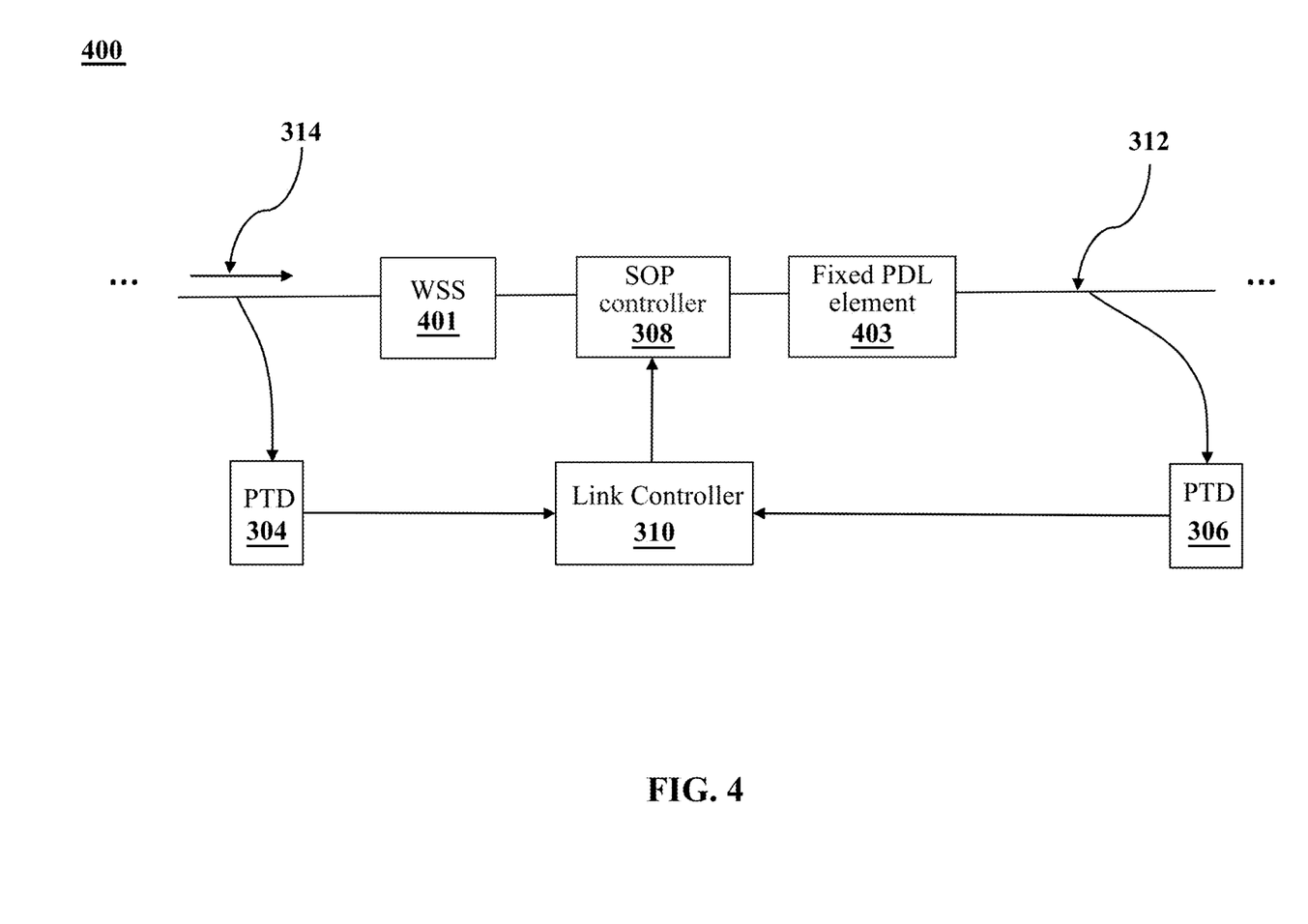
FIG. 4 illustrates an updated portion of the DWDM link including a fixed PDL element, in accordance with various non-limiting embodiments of the present disclosure.

FIG. 4 illustrates an updated portion 400 of the DWDM link 100 including a fixed PDL element 402, in accordance with various non-limiting embodiments of the present disclosure. As shown, in the updated portion 400, the fixed PDL element 402 may be arranged in series with the SOP controller 308

Similar to the portion 300, in the updated portion 400 the link controller 310 may be configured to determine PDL contributed by a WSS 401 based on the difference between the power differences $\Delta P_2$ and $\Delta P_1$. The link controller 310 may compute the power difference $\Delta P_2$ at the output of the fixed PDL element 402 based on equation 3 as discussed above.

It is contemplated that the PDL computed based on the equation 3 may include the contribution of the fixed PDL element 402. The amount of PDL contributed by the fixed PDL element 402 may be determined based on an approximate average PDL value of the WSS 401 for different wavelengths.

In the event that the PDL in the portion 400 is below the acceptable threshold, the link controller 310 may not take any action. However, if the PDL is above the acceptable threshold, the link controller 310 may send a control signal to the SOP controller 308. Based on the control signal, the SOP controller 308 may alter the X-polarization and Y-polarization components of the optical signal 314.

Based on the alteration of the X-polarization and Y-polarization components of the optical signal 314, the first PTD 304 and the second PTD 306 may again measure the updated power differences $\Delta P_1$ and $\Delta P_2$ between two orthogonal polarizations respectively. Based on the updated power differences $\Delta P_1$ and $\Delta P_2$ the link controller 310 may again determine the PDL in the portion 300. In the event that the PDL is below the acceptable threshold, the link controller 310 may not take any further action. However, if the PDL is above the acceptable threshold, the link controller 310 may again send another control signal to the SOP controller 308. The SOP controller 308 may again alter the X-polarization and Y-polarization components of the optical signal 314. This process of altering the polarization of the optical signal 314 is repeated until the PDL is reduced to at least the acceptable threshold.

Thus, by virtue of SOP controller 308 (and optionally due to the fixed PDL element 402) and the link controller 310, the PDL in the portion 300 may be significantly reduced. Also, the SOP controller 308 and the link controller 310 may not add significant hardware complexity, as various embodiments of the present disclosure may operate with simple SOP controllers.

Figure 5:
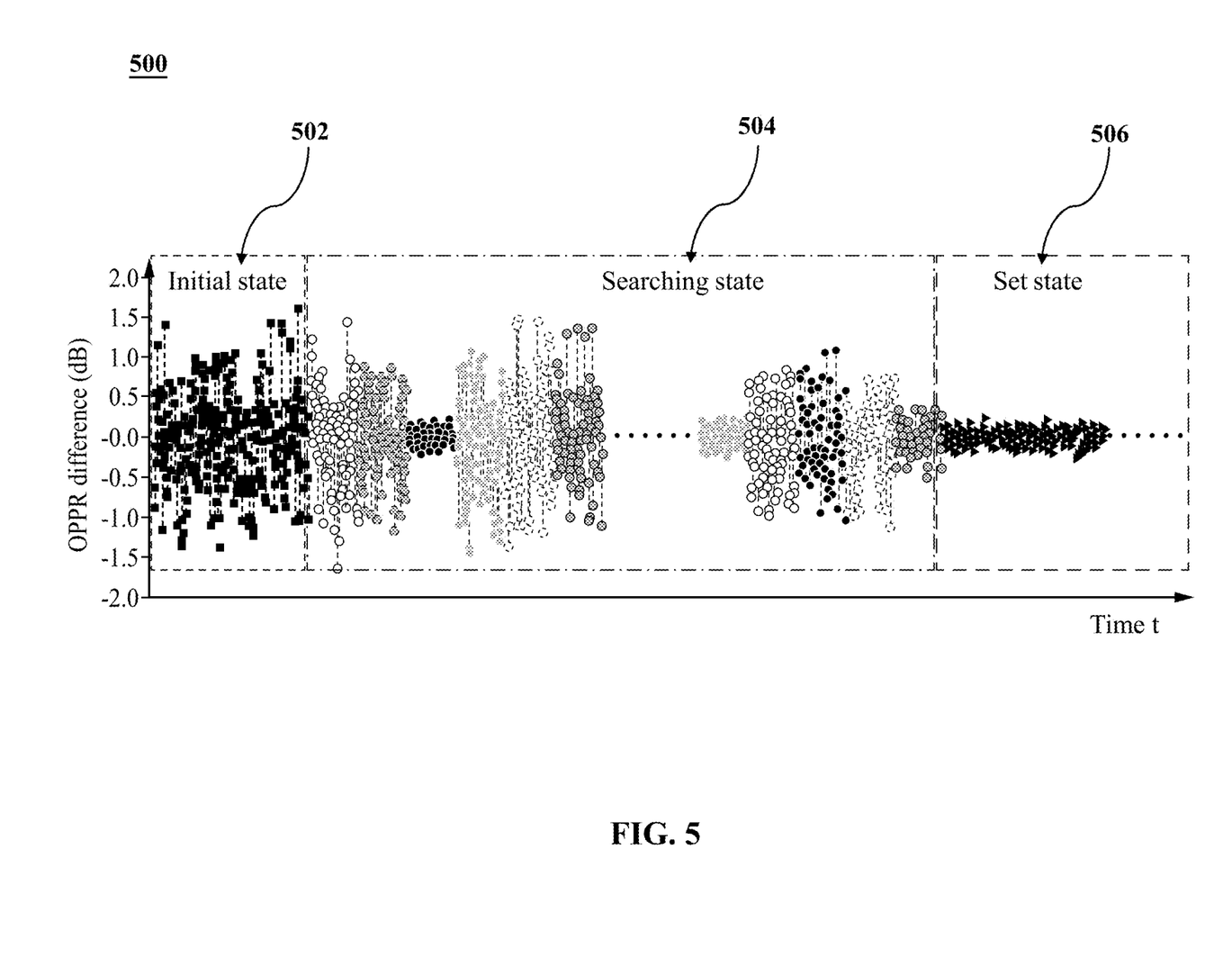
FIG. 5 illustrates an experimental outcome depicting various states of a process for reducing the PDL of wavelength selective switches (WSSs), in accordance with various non-limiting embodiments of the present disclosure.

FIG. 5 illustrates an experimental outcome 500 depicting various states of a process reducing the PDL in the portion of the DWDM link 100, in accordance with various non-limiting embodiments of the present disclosure. Initial state 502 may represent a state prior to searching for the change in SOP required by the SOP controller 308 to reduce the PDL in DWDM link 100. In other words, the initial state 502 may represent orthogonal polarization power ratio (OPPR) difference before the optical signal is SOP adjusted by the SOP controller 308 in the portion 300 or 400 of the DWDM link 100. The initial state may be determined by the link controller 310 before the optical signal is propagated in the DWDM link 100.

Searching state 504 represents a state where the SOP controller 308 may alter the SOP of the optical signal 314 for different SOP states. In the searching state 504, the link controller 310 may generate control signals in accordance with which the SOP controller 308 may alter the SOP of the optical signal 314. The set state 506 may represent a state in which PDL has been reduced to a level which is lower than the acceptable threshold.

Figure 6:
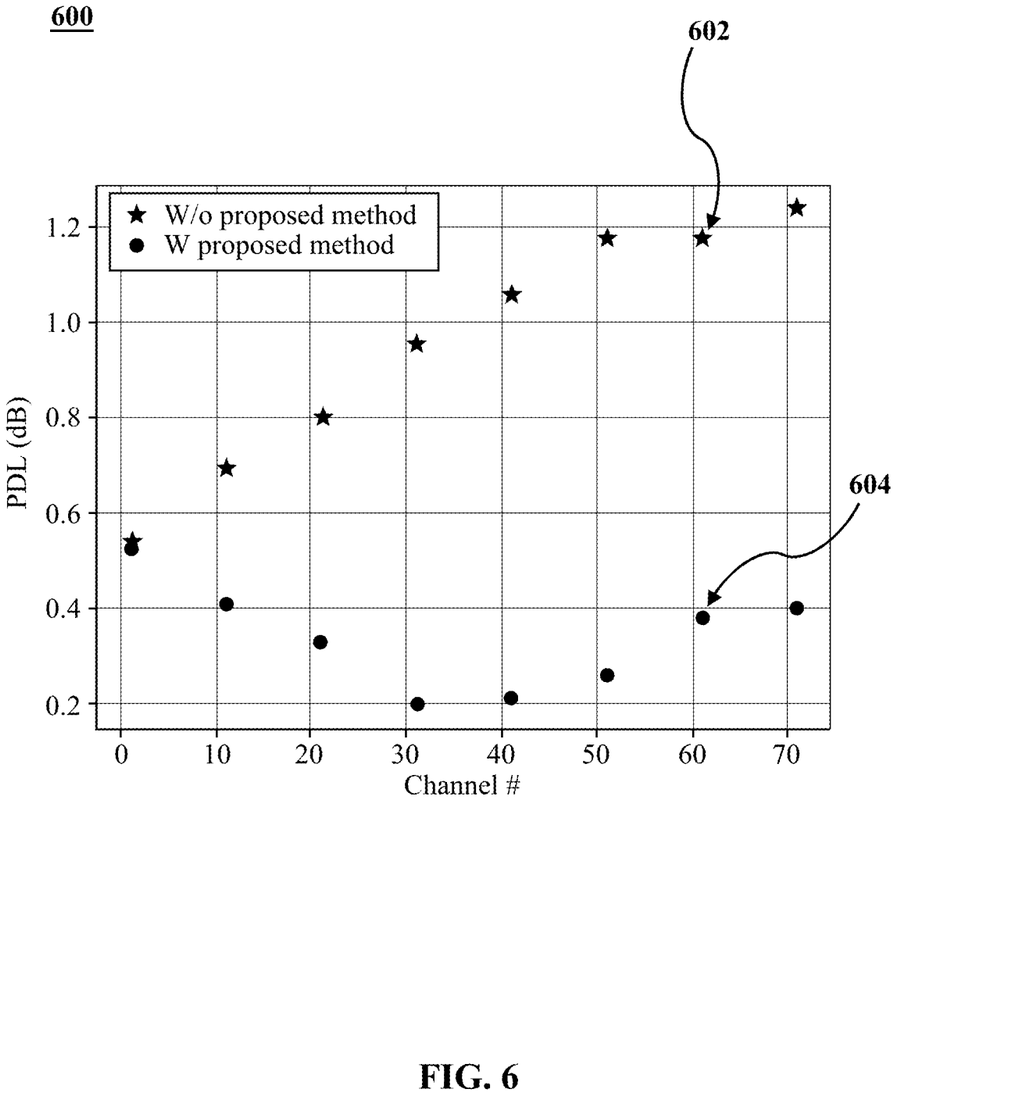
FIG. 6 illustrates an experimental outcome depicting the effect of PDL compensation, in accordance with various non-limiting embodiments of the present disclosure.

FIG. 6 illustrates an experiment outcome 600 depicting the effect of PDL compensation, in accordance with various non-limiting embodiments of the present disclosure. As shown, curve 602 illustrates a relation between PDL and wavelength channels of the optical signals propagating in the DWDM link 100 before implementing the PDL compensation techniques discussed in the present disclosure. The average PDL before the PDL compensation techniques is about 0.9 dB (minimum of 0.6 dB and maximum of 1.2 dB). Curve 604 illustrates a relation between PDL and wavelength channels of the optical signals propagating in the DWDM link 100 after implementing the PDL compensation techniques discussed in the present disclosure. More particularly, after including the fixed PDL element 402 in the portion 400. The fixed PDL element 402 may have 0.9 dB PDL to cancel the PDL due to WSS 401. The curve 604 may represent due to the WSS 401 cascaded with the fixed PDL element 402. After implementing the techniques of the present disclosure, effect of PDL in the portion of the DWDM link 100 may be significantly reduced.

Figure 7:
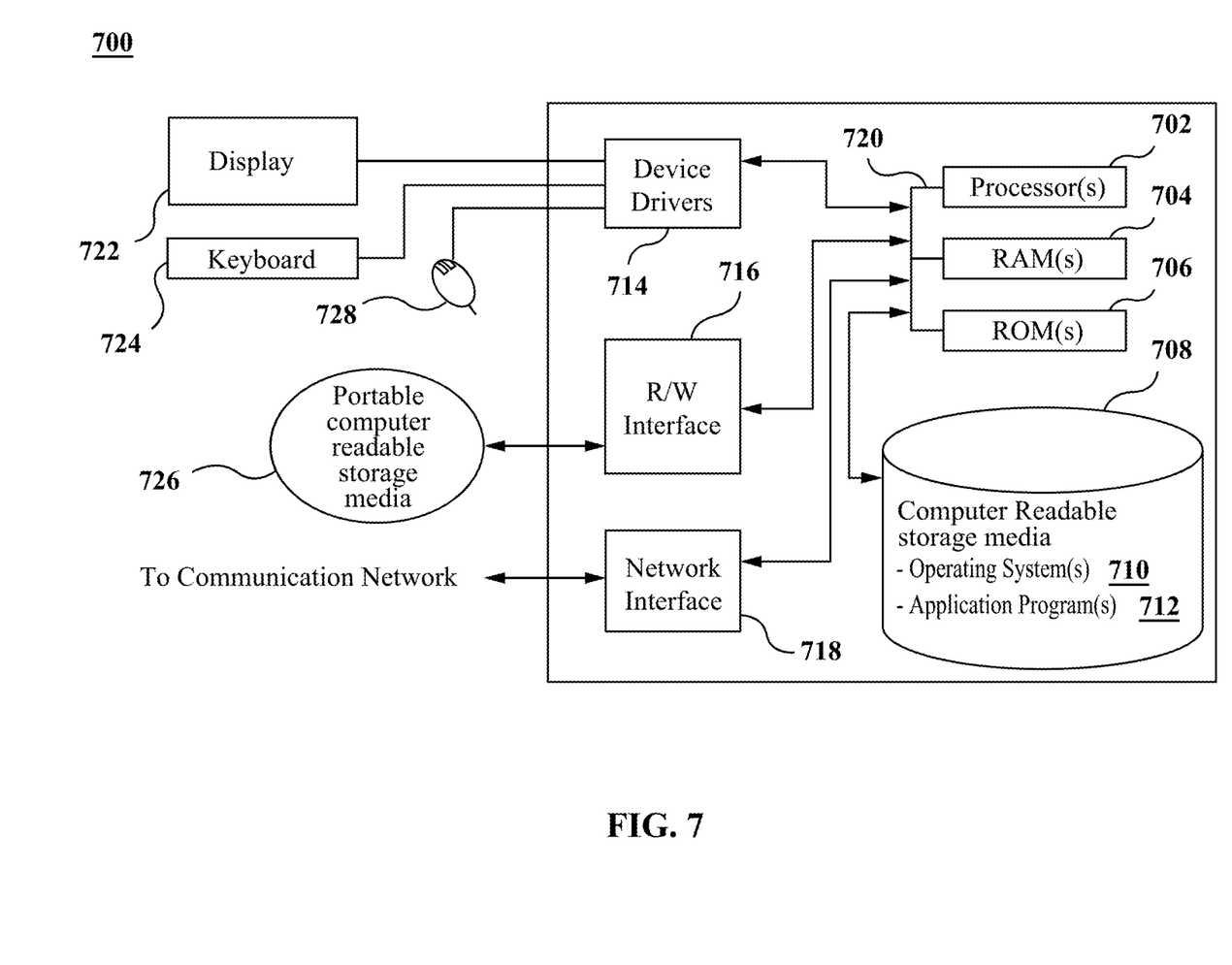
FIG. 7 depicts a high-level block diagram of exemplary components of a controller, in accordance with various embodiments of the present disclosure.

FIG. 7 depicts a high-level block diagram of exemplary components of the controller 120, in accordance with various embodiments of the present disclosure. It should be appreciated that FIG. 7 provides only an illustration of one implementation of controller 120 and does not imply any limitations with regard to the environments in which different embodiments may be implemented. Further, the link controller 310 may be implemented in a similar manner to the link controller 120. Many modifications to the depicted environment can be done to implement controller 120 without departing from the principles presented herein. The controller 120 may be a server, a desktop computer, a laptop computer, or any device that may be configured to implement the present technology, as should be understood by a person skilled in the art.

As shown, controller 120 employs one or more processors 702, one or more computer-readable random access memories (RAMs) 704, one or more computer-readable read only memories (ROMs) 706, one or more computer-readable storage media 708, device drivers 714, a read/write (R/W) driver interface 716, a network interface 718, all interconnected over a communication fabric 720. The communication fabric 720 may be implemented by any architecture designed for passing data and/or control information between processors (such as microprocessors, communications and network processors, etc.), system memory, peripheral devices, and any other hardware components within a system.

One or more operating systems 710 and one or more application programs 712 are stored on one or more of computer-readable storage media 708 for execution by one or more of the processors 702 via one or more of respective RAMs 704 (which typically include a cache memory). In the illustrated embodiment, each of the computer-readable storage media 708 maybe a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 716 reads from and writes to one or more portable computer-readable storage media 726. The application programs 712 may be stored on one or more of portable computer-readable storage media 726, read via the respective R/W driver interface 716 and loaded into the respective computer-readable storage media 708.

Further, network interface 718 may be based on a TCP/IP adapter card or wireless communication adapter (such as a 4G wireless communication adapter using OFDMA technology). The application programs 712 on controller 120 may be downloaded to controller 120 from an external computer or external storage device via a communication network (for example, the Internet, a local area network or other wide area network or wireless network) and network interface 718. From network interface 718, application programs 712 may be loaded onto the computer-readable storage media 708. The controller 120 may connect to routers, firewalls, switches, gateway computers and/or edge servers of the communication network using copper wires, optical fibers, wireless transmission, and the like.

The controller 120 may also include a display screen 722, a keyboard or keypad 724, and a computer mouse or touchpad 728. The device drivers 714 may interface with display screen 722 for imaging, with the keyboard or the keypad 724, with computer mouse or touchpad 728, and/or with display screen 722 (which may be a touch sensitive display) for alphanumeric character entry and user selections. The device drivers 714, R/W driver interface 716 and network interface 718 may comprise hardware and software (stored on the computer-readable storage media 708 and/or the ROM 706).

Figure 8:
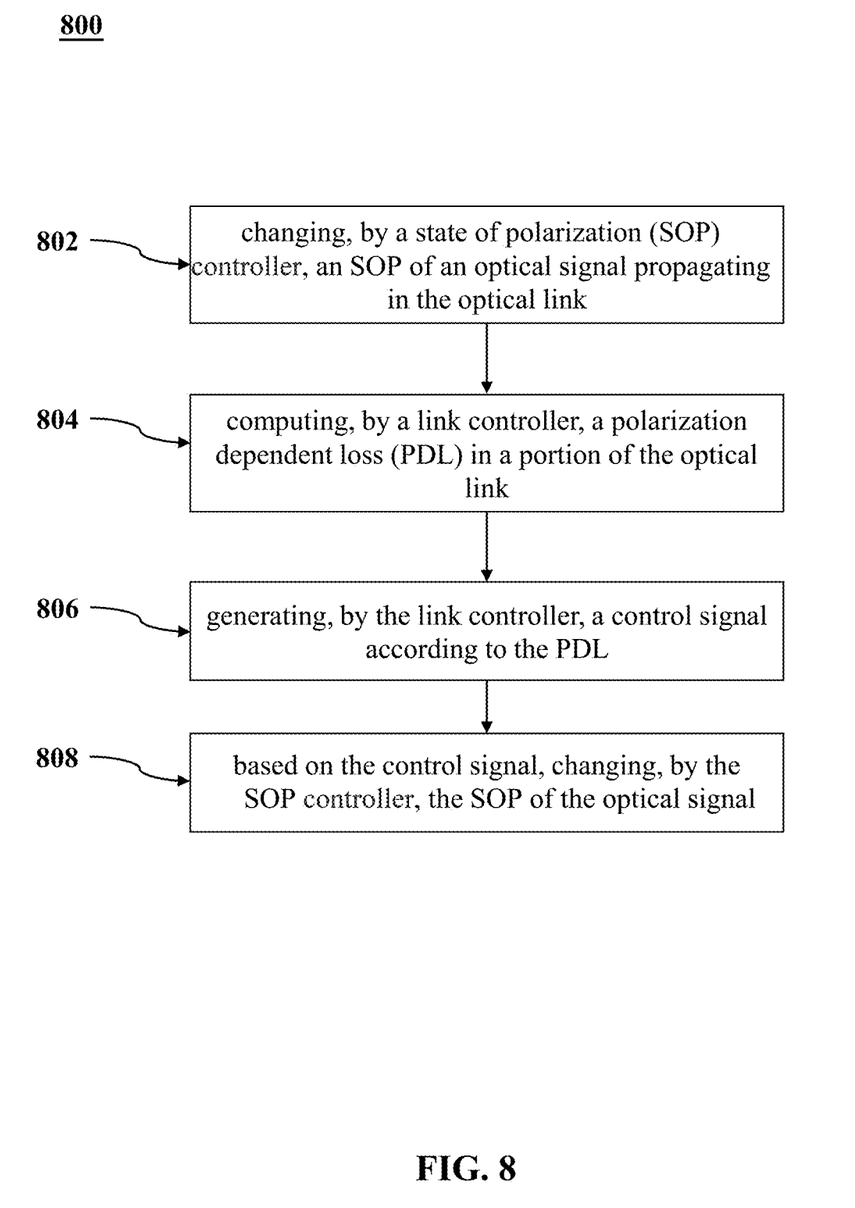
FIG. 8 illustrates a flowchart of a process reducing PDL in the DWDM optical link, in accordance with various embodiments of the present disclosure.

FIG. 8 illustrates a flowchart of a process 800 for reducing PDL in the DWDM link 100, in accordance with various embodiments of the present disclosure. As shown, the process 802 commences at step 802, where the SOP controller changes an SOP of an optical signal propagating in an optical link. As discussed above, the SOP controller 308 changes the SOP of the optical signal 314 propagating in the DWDM link 100.

The process 800 advances to step 804, where the link controller computes a PDL in a portion of the optical link. As previously discussed, the link controller 310 computes PDL in the portion 300, and 400 included in the DWDM link 100.

The process proceeds to step 806, where the link controller generates a control signal according to the PDL. As previously noted, the link controller 310 may generate a control signal according to the PDL.

Finally, at step 808, the SOP controller changes the SOP of the optical signal. As previously discussed, based on the control signal, the SOP controller 308 may change the SOP of the optical signal 314.

It is to be understood that the operations and functionality of the SOP controller 308, and the link controllers 120, and 310, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

The invention claimed is:

1. A system for reducing polarization dependent loss (PDL) in an optical link comprising:
   a state of polarization (SOP) controller configured to change an SOP of an optical signal propagating in the optical link;
   a link controller operatively connected to the SOP controller;
   a first pilot tone detector (PTD) configured to determine a first power difference $\Delta P_1$ of a first set of amplitude modulation pilot tone (PT) signals, the first set of amplitude modulation PT signals being embedded in X-polarization and Y-polarization components of the optical signal before the optical signal is propagated through a first optical element included in the optical link, the first PTD being configured to provide the first power difference of the first set of amplitude modulation PT signals to the link controller; and
   a second PTD configured to determine a second power difference $\Delta P_2$ of a second set of amplitude modulation PT signals in the optical signal, the second set of amplitude PT signals being sensed after the optical signal is propagated through the first optical element, the SOP controller, and a second optical element included in the optical link, the second PTD being configured to provide the second power difference of the second set of detected PT signals to the link controller, the second set of PT signals having been affected by the PDL due to the first optical element and the second optical element,
   the link controller being configured to:
      control the SOP controller to change polarization of signals propagating therethrough;
      compute the PDL based on the power difference $\Delta P_1$ of the first set of detected PT signals and the power difference $\Delta P_2$ of the second set of detected PT signals; and
      iteratively:
         control the SOP controller to expose the optical signal to different polarization states, and
         compute the PDL,
      until the determined PDL is less than or equal to an acceptable threshold.

2. The system of claim 1, wherein the first optical element and the second optical element are at least one of wavelength selective switches (WSSs), and optical amplifiers.

3. The system of claim 1, further comprising a fixed PDL element configured to contribute a fixed PDL to the optical signal.

4. The system of claim 3, wherein the fixed PDL element is located adjacent to the SOP controller.

5. The system of claim 3, wherein the fixed PDL element is located after the SOP controller.

6. The system of claim 1, wherein the SOP controller is one of a liquid crystal SOP controller or a squeezing fiber.

7. The system of claim 1, wherein the link controller is further configured to:
   determine the power difference $\Delta P_1$ by determining:
   $$\Delta P_1 = 10 \log_{10}(P_{1f_x}/P_{1f_y}),$$
   where $P_{1f_x}$ and $P_{1f_y}$ are pilot tone powers of the X-polarized component and the Y-polarized component, respectively, of the optical signal before progressed through the first optical component;
   determine the power difference $\Delta P_2$ by determining:
   $$\Delta P_2 = 10 \log_{10}(P_{2f_x}/P_{2f_y}),$$
   where $P_{2f_x}$ and $P_{2f_y}$ are pilot tone powers of the X-polarized component and the Y-polarized component of the optical signal, respectively, after progressing through the first optical component, the SOP controller, and the second optical component;
   compute a power difference between the first pilot tones and the second pilot tones by determining:
   $$\Delta P_{21} = \Delta P_2 - \Delta P_1;\text{ and}$$
   compute the determined PDL of the link by determining:
   $$PDL = 0.5(\Delta P_{21}^{max} - \Delta P_{21}^{min}).$$

8. A method for reducing polarization dependent loss (PDL) in an optical link, the method being executed by a link controller, the method comprising:
changing, by a state of polarization (SOP) controller operatively connected to the link controller, an SOP of an optical signal propagating in the optical link;
determining, by a first pilot tone detector (PTD) communicatively connected to the link controller, a first power difference $\Delta P_1$ of a first set of amplitude modulation pilot tone (PT) signals, the first set of amplitude modulation PT signals being embedded in X-polarization and Y-polarization components of the optical signal before the optical signal is propagated through a first optical element included in the optical link;
providing, by the first PTD, the first power difference $\Delta P_1$ to the link controller;
determining, by a second PTD communicatively connected to the link controller, a second power difference $\Delta P_2$ of a second set of amplitude modulation PT signals in the optical signal, the second set of amplitude modulation PT signals being sensed after the optical signal is propagated through the first optical element, the SOP controller, and a second optical element included in the optical link;
providing, by the second PTD, the second power difference $\Delta P_2$ to the link controller;
computing, by the link controller, a polarization dependent loss (PDL) based on the first power difference $\Delta P_1$ and the second power difference $\Delta P_2$;
changing, by the SOP controller, the SOP of the optical signal; and
iteratively:
controlling the SOP controller to expose the optical signal to different polarization states, and
computing the PDL,
until the determined PDL is less than or equal to an acceptable threshold.

9. The method of claim 8, wherein the first optical element and the second optical element are at least one of wavelength selective switches (WSSs), and optical amplifiers.

10. The method of claim 8, further comprising contributing, by a fixed PDL element, a fixed PDL to the optical signal.

11. The method of claim 10, wherein the fixed PDL element is located adjacent to the SOP controller.

12. The method of claim 10, wherein the fixed PDL element is located after the SOP controller.

13. The method of claim 8, wherein the SOP controller is one of a liquid crystal SOP controller or a squeezing fiber.

* * * * *